Figure 1:
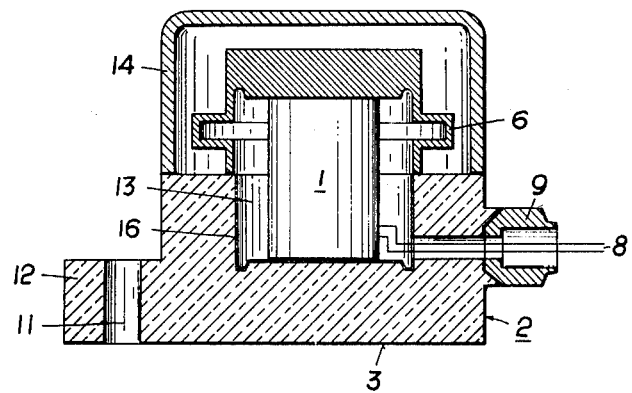

United States Patent
Hatschek

[15] 3,636,387
[45] Jan. 18, 1972

[54] PIEZOELECTRIC ACCELEROMETER

[72] Inventor: Rudolf A. Hatschek, Fribourg, Switzerland

[73] Assignee: Vibro-Meter AG, Fribourg, Moncor, Switzerland

[22] Filed: June 24, 1969

[21] Appl. No.: 836,098

[30] Foreign Application Priority Data

July 4, 1968 Austria .................................A 6402/68

[52] U.S. Cl..................................................310/8.4, 310/9
[51] Int. Cl. ..........................................................H01v 7/00
[58] Field of Search..........................310/8.4, 8.3, 8.9, 8.7, 9; 73/74, 487

[56] References Cited

UNITED STATES PATENTS

| | | | |
|---|---|---|---|
| 3,378,705 | 4/1968 | Bacon | 310/9.5 |
| 3,390,287 | 6/1968 | Sondereggev | 310/9.6 |
| 3,461,327 | 8/1969 | Zeiringer | 310/8.9 |
| 3,042,744 | 7/1962 | Shoot | 310/8.4 |
| 3,229,153 | 1/1966 | Freeman | 315/55 |

Primary Examiner—D. F. Duggan
Assistant Examiner—B. A. Reynolds
Attorney—Watson, Cole, Grindle & Watson

[57] ABSTRACT

A piezoelectric accelerometer in which a measuring element is mounted in a housing of ceramic material with a part adapted to rest on the object to be measured to achieve a high degree of heat resistance together with heat insulation and good transfer of mechanical oscillations.

5 Claims, 3 Drawing Figures

PATENTED JAN 18 1972   3,636,387

Inventor:
Rudolf A. Hatschek
By
Watson, Cole, Grindle & Watson
Attys.

PIEZOELECTRIC ACCELEROMETER

This invention relates to a piezoelectric accelerometer whose measuring element is disposed in a housing which is mounted on the object which is to be measured.

Piezoelectric accelerometers are used as it is well known, for the measuring of accelerating forces and especially for the surveillance of vibrations of running machines and driving systems, for example, for the operational surveillance of airplane power units. In order to make possible a good transfer of the vibrations of the supervised engines to the sensitive measuring element of the accelerometer, the housing of the accelerometer must be in a rigid mechanical connection with the supervised engine and therefore it must be mounted at suitable positions directly on the engine. The accelerometers in that case are exposed often to relatively high temperatures, as for example, in the case of the surveillance of jet engines, in which case they are seated directly on the casing of the propulsion system. The piezoelectric quartz bodies used most frequently for practical purposes can be used only up to a temperature of 400°–500° C., because at a greater heating up of the quartz, the signals become too weak. Further difficulties result in the case of higher temperatures by the heat expansions of the housing which occur and of the sensitive measuring element which because of the varying heating up, often differ from one another and can lead to a disadvantageous change in the bias power of the piezoelement.

Thus two essential requirements are made above all, in regard to piezoelectric accelerometers, that is the mechanical connection between the measured object, and the sensitive measuring element arranged in the housing of the accelerometer, must be as rigid as possible in order that a good transference of the oscillations and vibrations can be accomplished, and the component parts of the accelerometer must have a sufficient heat resistance without as a result thereof, impairing the measurement technical characteristics of the accelerometer especially its sensitiveness. The piezoelectric accelerometers known hitherto do not always meet these requirements.

This invention has for its object and improvement of the piezoelectric accelerometers both in regard to heat resistance and in the transfer of oscillations, and it consists in the fact that the housing is made of a ceramic material preferably of aluminum oxide ceramic material, at least in part and at the very least, at that end which rests on the object to be measured. It has turned out that ceramic materials do not merely have advantageous mechanical and thermal characteristics but that they also make possible a suitable shaping without difficulty and that they can be assembled with the remaining components of the accelerometer. For example ceramic material made of aluminum oxide has a considerably higher elasticity modulus than steel, as a result of which, a good transference of mechanical signals will be assured and besides, a high degree of heat resistance so that an accelerometer made out of it can withstand extreme temperatures. Furthermore, as is well known, ceramic materials are poor heat conductors, so that a further advantage of the invention consists in a decrease in the heat conduction between the object to be measured and the sensitive measuring element.

Ceramic materials hitherto have been used in connection with piezoelectric accelerometers only for purposes of electric insulation and during calibration of the accelerometer as a support for the joint reception of the calibrating device and of the accelerometers that are to be calibrated. In the case of a known design, the bottom surface of the metallic housing of the accelerometer, with which the latter is mounted on the object to be measured, is provided with a thin layer made of ceramic material in order to achieve an electric insulation between the accelerometer and the object to be measured. However, as a result thereof, neither the transference of mechanical signals will be improved essentially nor will the heating up of the accelerometer be lowered or its heat resistance improved. Also in the case of calibration of accelerometers, the use of ceramic materials has for its purpose in the first place to establish an electric insulation between the housings of the calibration device consisting in a customary manner of metal, and of the accelerometers that are to be calibrated on the one hand, and between said accelerometers and the vibrating table supplying the calibration signal on the other hand. Furthermore, inaccuracies during calibration based on varying oscillations between the transmitter that is to be tested and the calibration device should be avoided by the considerable rigidity of the ceramic materials. Differing from these known uses, the housing of the accelerometer itself according to the invention is made wholly or partially of ceramic material and besides a rigid mechanical connection between the accelerometer and the object to be measured, a high degree of heat resistance of the accelerometer will be achieved so that the latter can also be used at measuring places where high temperatures occur.

Within the framework of the invention various designs of the accelerometer have proven themselves to be advantageous. For example, the housing may have a lower part made of ceramic material with a hollow space which is open on top and which is closed by an upper part consisting of metal and placed onto the lower part whereby the lower part and the upper part together encompass the measuring element. The housing however can consist of ceramic material. It can possibly have an annular base on which an intermediate piece made of metal is attached preferably by hard soldering to which the metallic upper part of the housing encompassing the measuring element has been welded on. In both cases that part of the housing which is thermally under the highest load across which the transference of the mechanical signals also takes place, consists of ceramic material whereas the part of the housing which is under a lesser load is produced in the customary manner of metal. Thus, one is dealing with simple forms of design of the accelerometer according to the invention.

In order to shield the sensitive measuring element electrically and magnetically, it is possible according to the invention to provide the parts of the housing consisting of ceramic material, which encompasses the measuring element, with a metallic coating provided preferably on the inside wall of the housing By this practical measure, above all in the case of the housing produced by ceramic material in their entirety, electric and magnetic interspersions are avoided by which the measurement could be invalidated.

Figure 2:
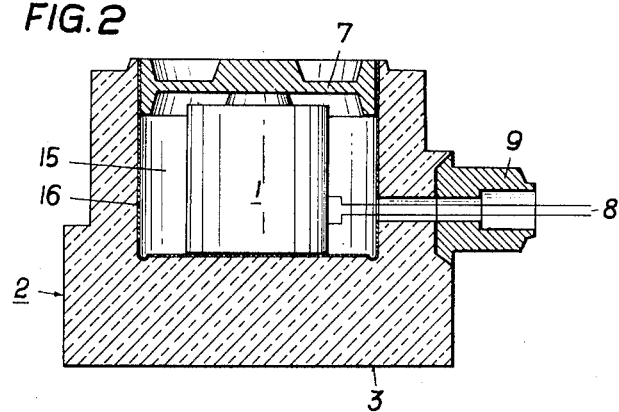
Figure 3:
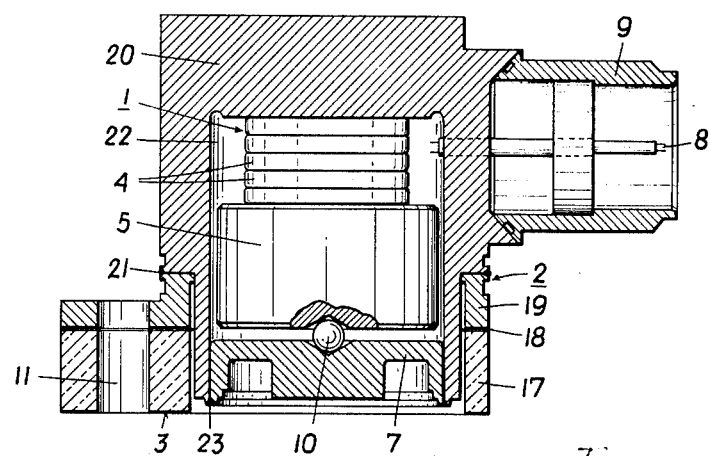

Further objects of the invention will be apparent from the following description when considered in connection with the accompanying drawing in which, FIG. 1 is an axial section of the accelerometer according to the invention, FIG. 2 is an axial section of a modified embodiment, and FIG. 3 is an axial section of a further modified embodiment.

In all embodiments given by way of example, the sensitive measuring element 1 of the accelerometer has been disposed in a housing 2, which is mounted with its bottom surface 3 directly on the object that is to be measured. As becomes clear from FIG. 3, the measuring element 1 consists of disks 4 made of piezoelectric material which has been placed in layers above one another with interposition of electrodes and of a seismic mass 5. The bias of the measuring element is accomplished by a biasing arrangement which, according to FIG. 1, consists of a bias coil 6 and in the embodiments according to FIGS. 2 and 3, shown by way of example, of a bias plate spring 7. The electric connecting lines 8 are conducted to the outside in an airtight manner through a connecting plug 9 attached to the housing 2. The seismic mass 5 shown in FIG. 3 is supported rigidly on the bias plate spring 7 by means of a ball 10. The attachment of the accelerometer to the place of measurement is accomplished by means of screws which penetrate bores 11 in the floor part of the housing 2 which can be developed, for example, in the manner of a flange with a triangular base surface.

In the case of the embodiment shown in FIG. 1 by way of example, the housing 2 has a lower part 12 made from ceramic material preferably from aluminum oxide ceramic material which lower part has been provided with a hollow space 13 open on top into which the measuring element 1 is inserted from above. The upper part of the housing 2 consists of metal and is composed of a bias casing 6 and a cover hood 14. According to FIG. 2 on the other hand, the housing 2 is made in its entirety of ceramic material and has been equipped with a cylindrical hollow space 15 which houses the measuring element 1. The bias plate spring 7 has been inserted into the hollow space 15 and has been attached with the required pretension. In the parts of the housing 2 consisting of ceramic material, the hollow spaces 13 and 15 are provided with a metallic coating 16 which has been applied to the inside wall of the housing, for example, it has been sprayed on or steamed on and it has the object of shielding the sensitive measuring element 1 electrically and magnetically.

In the embodiment according to FIG. 3, given by way of example, the housing 2 has been provided with an annular base 17 consisting of ceramic material on which an intermediate piece 19 made of metal has been attached by means of a layer of solder 18, on which has been placed an upper part 20 of the housing consisting of metal in the customary manner. A firm connection between the intermediate piece 19 and the upper part 20 is accomplished by means of a welding seam 21. The metallic upper part 20 will receive the sensitive measuring element 1 in a cylindrical hollow space 22, and it forms the shield at the same time so that a metallic coating is superfluous. The prestressed plate spring 7 has been inserted into the cylindrical hollow space 22 and has been attached therein in the prestressed position, by a welding seam 23.

In all embodiments given by way of example, the housing 2 of the accelerometer has thus been produced from ceramic material, at least partially and to be sure at the very least, that part of the housing which rests directly on the object to be measured. In consequence of the high modulus of elasticity of the ceramic material, a rigid mechanical connection between the object to be measured and the sensitive measuring element of the accelerometer will be assured as a result thereof. Besides, the accelerometer excells under great heat resistance since the housing consists of ceramic material precisely in those parts which are exposed to the highest temperature, which ceramic material has a great heat resistance and a low heat conductivity. Finally, the shapes shown can be easily produced.

I claim:

1. A piezoelectric accelerometer comprising a housing adapted to be mounted on the object that is to be measured, a measuring element in the housing, the housing being composed of a ceramic material at least partially and at least to that part of the housing which is adapted to rest directly on the object to be measured, to avoid metallic heat transmission between the said object and the measuring element and to achieve a higher degree of heat resistance, heat insulation and good transfer of mechanical oscillations.

2. Piezoelectric accelerometer according to claim 1, in which the housing has a lower part with a hollow space open on top and which is closed at an upper part consisting of metal and placed on the lower part whereby the lower part and the upper part together enclose the measuring element.

3. Piezoelectric accelerometer according to claim 1, in which the housing has an annular base consisting of ceramic material on which by intermediate element made of metal is attached to which the metallic upper part of the housing encompassing the measuring element has been welded.

4. Piezoelectric accelerometer according to claim 1, in which the ceramic material is produced from an aluminum oxide material.

5. Piezoelectric accelerometer according to claim 3, in which the intermediate element is attached by soldering.

* * * * *